Patented July 17, 1951

UNITED STATES PATENT OFFICE 2,561,245

2-METHYL-4-KETO-3-SUBSTITUTED THIAZOLINIUM DYE INTERMEDIATES

Thomas R. Thompson and Stanley P. Popeck, Binghamton, N. Y., assignors to General Aniline & Film Corporation, New York, N. Y., a corporation of Delaware No Drawing. Application December 30, 1949, Serial No. 136,150

10 Claims. (Cl. 260—303.1)

This invention relates to 2-methyl-4-keto-3-substituted thiazolinium halides which are useful as cyanine dye intermediates in the preparation of trinuclear cyanine dyes.

One of the objects of the present invention is a process of manufacturing 2-methyl-4-keto-3-substituted thiazolinium salts containing either two reactive methyl groups or a reactive methyl and a reactive methylene group in one simple structure.

A further object is the 4-keto-3-substituted thiazolinium salts which are useful in the preparation of trinuclear cyanine dyestuffs as sensitizers for silver-halide emulsions.

Other objects and advantages will appear hereinafter.

The foregoing objects are accomplished, in accordance with the present invention, by condensing an α-halogen acetic acid or an α-halogen propionic acid with N-mono-substituted thioacetamide. The condensation reaction is best effected by simply allowing the coreactants to stand at temperatures ranging from 0° C. to 40° C., and preferably at about room temperature in an inert solvent, such as acetone. After several hours, the product separates as crystals. Ordinarily, an excess of the α-halogen acetic acid is used, and it is most convenient to employ equal weights. In cases where the product does not separate from the reaction medium, it may be necessary to effect precipitation by adding ether, benzene, petroleum ether, and the like.

The thiazolinium salts obtained by the foregoing procedure are characterized by the following general formula:

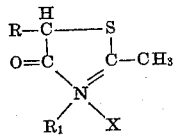

wherein R represents hydrogen or a methyl group, $R_1$ represents an alkyl, cycloalkyl, aryl, aralkyl or heterocyclic group, e. g., methyl, ethyl, propyl, butyl, etc., cyclopentyl, cyclohexyl, etc., phenyl, naphthyl, o-, m-, and p-tolyl, o-, m-, and p-methoxyphenyl, benzyl, phenethyl, etc., thienyl, pyrryl, furyl, and the like, and X represents a halogen, e. g., bromide, chloride, or iodide.

The reaction involved, while utilizing an α-halogen acetic acid or an α-halogen propionic acid, is believed to take place as follows:

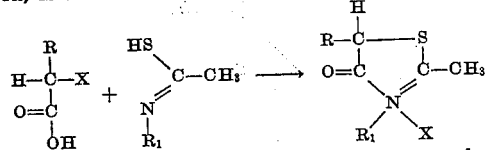

wherein R, $R_1$ and X have the values given above.

As typical examples of N-mono-substituted thioacetamides, the following may be mentioned:

N-methylthioacetamide
N-ethylthioacetamide
N-propylthioacetamide
N-isopropylthioacetamide
N-butylthioacetamide
Thioacetanilide
2-thioacetnaphthalide
o-Thioacetotoluide
m-Thioacetotaluide
p-Thioacetotoluide
o-Thioacetaniside
p-Thioacetaniside
Thioacet-asymm-m-xylidide
2-thioacetaminothiophene The following are examples of α-halogen acetic and α-halogen propionic acids:

α-Chloroacetic acid
α-Bromoacetic acid
α-Iodoacetic acid
α-Chloropropionic acid
α-Bromopropionic acid
α-Iodopropionic acid The following examples describe the preparation of some of the 2-methyl-4-keto-3-substituted-thiazolinium halides.

Example I

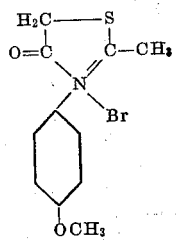

2-methyl-3-(p-methoxyphenyl)-4-ketothiazolinium bromide

A solution of 5 grams of p-thioacetaniside in 25 cc. of acetone was added to a solution of 5 grams of bromoacetic acid in 25 cc. of acetone and the resulting mixture allowed to stand at 25° C. for 1½ hours. The reaction product separates as crystals and was purified by washing with acetone and finally with ether. A yield of 7.5 grams of a product melting at 142° C. with decomposition was obtained.

Example II

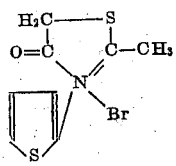

2-methyl-3-(2-thienyl)-4-ketothiazolinium bromide

A solution of 5 grams of 2-thioacetaminothiophene in 25 cc. of acetone was added to 5 grams of bromoacetic acid dissolved in 25 cc. of acetone and the mixture allowed to stand at 25° C. for 2 days. The product was precipitated by the addition of several volumes of ether and was purified by triturating with ether. A yield of 5.2 grams of a light brown powder, melting above 150° C. with decomposition was obtained.

*Example III*

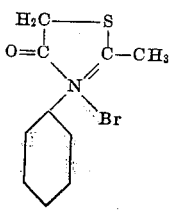

2-methyl-3-phenyl-4-ketothiazolinium bromide

A mixture of 2 grams of bromoacetic acid and 2 grams of thioacetanilide dissolved in 20 cc. of acetone were allowed to stand at room temperature (about 25° C.) for 2 hours. The product separates in crystalline form and was purified by washing with acetone and finally with ether. A yield of 2 grams of a product melting at 144° C. with decomposition was obtained.

*Example IV*

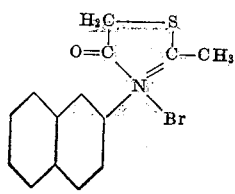

2-methyl-3-(2-naphthyl)-4-ketothiazolinium bromide

A solution of 5 grams of 2-thioacetnaphthalide in 25 cc. of acetone was mixed with 5 grams of bromoacetic acid in 25 cc. of acetone and the resulting mixture allowed to stand at room temperature for 2 hours. The product separates in crystalline form and was purified by washing with acetone and finally with ether. A yield of 4.7 grams of a product melting at 195° C. with decomposition was obtained.

*Example V*

Example I was repeated with the exception that 3.4 grams of chloroacetic acid was used in place of 5 grams of bromoacetic acid. The 2-methyl-3-(p-methoxyphenyl)-4-ketothiazolinium chloride was thus obtained.

In addition to the above described salts, which have a reactive methyl group in the 2-position and a reactive methylene group in the 5-position, 4-keto-thiazolinium dye salt intermediates containing a methyl group in both the 2- and 5-positions may be prepared by condensing an α-halogen propionic acid with any one of the aforementioned N-mono-substituted thioacetamides. These compounds are useful as intermediates for the preparation of dinuclear cyanine dyes.

The condensation of an α-halogen acetic acid with a thiopropanilide leads to a heterocyclic salt containing an ethyl group in the 2-position. The compounds, however, possessing the two reactive groups, i. e., a reactive methyl in the 2-position and a reactive methylene in the 5-position are most useful for the synthesis of trinuclear dyes.

The above dye salts may be converted to salts other than halogen by treating the halogen salt with an aqueous or aqueous alcoholic solution containing a sodium or potassium salt of perchloric or thiocyanic acid.

The foregoing 4-ketothiazolinium dye salt intermediates may be employed in the synthesis or trinuclear cyanine dyestuffs as sensitizers for silver halide emulsions. For example, by condensing 1 molecular proportion of a 4-ketothiazolinium salt with 2 molecular proportions of a cyanine dyestuff intermediate such as 2-methylmercaptobenzothiazole methiodide in a medium of pyridine, triethylamine, and acetic anhydride, there is produced a trinuclear cyanine dye.

While there have been pointed out certain preferred embodiments of the invention, the same is not limited to the foregoing examples, illustrations, or to the specific details given therein, but is capable of variation and modifications as to the reactants, proportions and conditions employed.

We claim:

1. A 4-keto-3-substituted thiazolinium salt characterized by the following general formula:

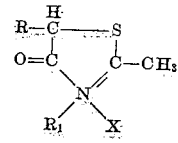

wherein R represents a member selected from the class consisting of hydrogen and methyl group, R₁ represents a member selected from the class consisting of lower alkyl, lower cycloalkyl, aryl of the benzene and naphthalene series, aralkyl of the benzene series, and 5-membered heterocyclic radical containing a single hetero atom in the ring and having a nuclear carbon atom joined to the nitrogen atom of the thiazolinium nucleus, and X represents a halogen.

2. A 4-ketothiazolinium cyanine dye intermediate having the following formula:

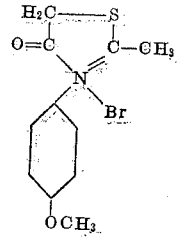

3. A 4-ketothiazolinium cyanine dye intermediate having the following formula:

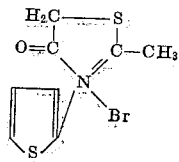

4. A 4-ketothiazolinium cyanine dye intermediate having the following formula:

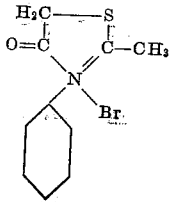

5. A 4-ketothiazolinium cyanine dye intermediate having the following formula:

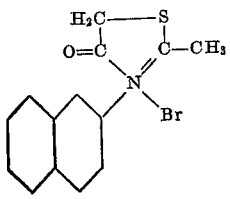

6. A process for the production of 4-keto-3-substituted thiazolinium salts which comprises reacting at temperatures ranging from 0° C. to 40° C., a compound of the general formula:

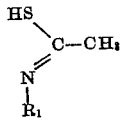

with a compound corresponding to the following formula:

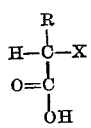

wherein R represents a member selected from the class consisting of hydrogen and methyl groups, $R_1$ represents a member selected from the class consisting of lower alkyl, lower cycloalkyl, aryl of the benzene and naphthalene series, aralkyl of the benzene series, and 5-membered heterocyclic radical containing a single hetero atom in the ring and having a nuclear carbon atom joined to the nitrogen atom of the thiazolinium nucleus and X represents a halogen.

7. A process for the production of a 4-ketothiazolinium cyanine dye intermediate which comprises reacting at about room temperature, thioacetaniside with bromoacetic acid.

8. A process for the production of a 4-ketothiazolinium cyanine dye intermediate which comprises reacting at about room temperature, 2-thioacetaminothiophene with bromoacetic acid.

9. A process for the production of a 4-ketothiazolinium cyanine dye intermediate which comprises reacting at about room temperature, thioacetanilide with bromoacetic acid.

10. A process for the production of a 4-ketothiazolinium cyanine dye intermediate which comprises reacting at about room temperature, thioacetnaphthalide with bromoacetic acid.

THOMAS R. THOMPSON.
STANLEY P. POPECK.

REFERENCES CITED

The following references are of record in the file of this patent:

UNITED STATES PATENTS

| Number | Name | Date |
| --- | --- | --- |
| 2,464,785 | Thompson | Mar. 22, 1949 |